United States Patent [19]
Vogel et al.

[11] Patent Number: 4,547,487

[45] Date of Patent: Oct. 15, 1985

[54] PROCESS FOR PREPARING CATALYSTS

[75] Inventors: Roger F. Vogel, Butler; Raymond J. Rennard, Oakmont; Joseph A. Tabacek, New Kensington, all of Pa.

[73] Assignee: Gulf Research & Development Company, Pittsburgh, Pa.

[21] Appl. No.: 495,968

[22] Filed: May 19, 1983

[51] Int. Cl.$^4$ .......................... B01J 21/04; B01J 21/06; B01J 23/30

[52] U.S. Cl. .................................. 502/351; 502/323; 502/349; 502/355

[58] Field of Search ............... 502/263, 309, 314, 324, 502/335, 341, 342, 346, 349, 351, 354, 355, 323

[56] References Cited

U.S. PATENT DOCUMENTS

| | | | |
|---|---|---|---|
| 1,914,558 | 6/1933 | Craver | 502/349 |
| 2,739,132 | 3/1956 | Riedl | 502/351 |
| 3,475,350 | 10/1969 | Winnick et al. | 502/354 |
| 3,900,430 | 8/1975 | Beaty | 502/323 |
| 3,972,829 | 8/1976 | Michalko | 502/324 |

*Primary Examiner*—W. J. Shine
*Attorney, Agent, or Firm*—Deane E. Keith; Forrest D. Stine; Joseph J. Carducci

[57] ABSTRACT

A process for preparing novel catalysts of increased activity, which comprises mixing alumina with (1) at least one metal compound and (2) an aqueous solution containing at least one dissolved compound therein that imparts to said aqueous solution a pH below 6.

12 Claims, No Drawings

PROCESS FOR PREPARING CATALYSTS

BACKGROUND OF THE INVENTION

1. Field of the Invention

This invention relates to a novel process for preparing novel catalysts of increased activity, which comprises mixing alumina with at least one metal compound and an aqueous solution containing at least one dissolved compound therein that imparts to said aqueous solution a pH below 6.

2. Description of the Prior Art

Catalysts can be prepared that are composed of an alumina support carrying metal components thereon, for example, compounds of nickel, titanium or molybdenum.

SUMMARY OF THE INVENTION

We have found that catalysts of increased activity can be prepared by mixing alumina with at least one metal compound, that is, to form the metallic component therewith, and an aqueous solution containing dissolved therein at least one compound that imparts to said aqueous solution a pH below 6.

In preparing the novel catalysts herein, four separate and distinct components are required. The first component is alumina, which will form the support portion of the novel catalyst claimed herein. Any of the known aluminas, or any aluminum compound capable of being calcined to alumina in air at a temperature of about 200° to about 1200° C. over a period of about 0.5 to about 24 hours, can be used. When an uncalcined alumina precursor is used, it is preferably selected from any of the well-known groups of hydroxides, hydrated oxides, carbonate compounds or mixtures thereof. Examples of such compounds are pseudoboehmite, boehmite, bayerite, gibbsite, nordstrandite, and ammonium aluminum carbonate hydroxide hydrate. Of these, we prefer to employ pseudoboehmite. If a precalcined alumina is used, it can be one or more of the well-known aluminas, examples of which are gamma, eta, theta, chi, alpha, delta, iota and kappa alumina. Of these, we prefer gamma and/or eta alumina. Additionally, precursors or aluminum oxides which are non-crystalline can also be utilized. In general the alumina will have an average pore radius of about 10 to about 300 Å, preferably about 20 to about 250 Å, a surface area of about 10 to about 500 m²/g, preferably about 50 to about 350 m²/g, and a pore volume of from about 0.05 to about 2.0 cc/g, preferably about 0.10 to about 1.5 cc/g, when measured by the nitrogen adsorption method (Barrett, E. P., Joyner, L. G. and Halenda, P. P., J. Am. Chem. Soc., 73, 373 (1951)).

The second component is composed of at least one metal compound that is desired to place upon the surface of the alumina. Any metal oxide or metal compound, organic or inorganic, capable of being converted to its oxide form under the calcination conditions defined above can be used. Thus, the metal portion of the metal compound will fall within Periods 4, 5 and 6 of the Periodic Table and will be selected from the groups consisting of IIA, IIIB, IVB, VIB and IVA of the Periodic Table and the elements Mg, V, Mn, Fe, Co, Ni, Cu, Zn, Si, Sb and Bi. Of these we prefer to use the corresponding metallic oxides, hydroxides or hydrated oxides and carbonates as the second component in the process for preparing the novel catalysts herein. The metallic portion is preferably titanium or zirconium.

Specific compounds that can be used as the second component in the preparation of the catalysts include:

| | |
|---|---|
| Group IIA metal compounds, such as: | |
| CaO, | |
| CaCO₃, | |
| SrO and | |
| BaO; | |
| Group IIIB metal compounds, such as: | |
| Sc₂O₃, | |
| Y₂O₃, | |
| La₂O₃, | |
| Ce₂O₃ and | |
| CeO₂; | |
| Group IVB metal compounds, such as: | |
| TiO₂, | ZrO₂, |
| TiO₂.xH₂O, | ZrO₂.xH₂O, |
| Ti(OC₃H₇)₄, | 3ZrO₂.CO₂.H₂O, |
| Ti(OC₄H₉)₄, | Zr(OH)₄, |
| Ti₂(C₂O₄)₃.10H₂O, | Zr(NO₃)₄.5H₂O, |
| Ti₂O₃, | Zr(SO₄)₂, |
| Ti₂(SO₄)₃, | Zr(OC₃H₇)₄, |
| TiOSO₄, | Zr(O₂C₅H₇)₄ and |
| | HfO₂; |
| Group VIB metal compounds, such as: | |
| Cr₂O₃, | |
| MoO₃, | |
| (NH₄)₆Mo₇O₂₄.4H₂O, | |
| (NH₄)₂MoO₄, | |
| 3(NH₄)₂.0.5 MoO₃.2MoO₄.6H₂O, | |
| [Mo(OCOCH₃)₂]₂, | |
| Mo(CO)₆, | |
| H₃PO₄.12MoO₃.xH₂O, | |
| (NH₄)₃PO₄.12MoO₃.xH₂O, | |
| H₄SiO₄.12MoO₃.xH₂O, | |
| (NH₄)₄SiO₄.12MoO₃.xH₂O, | |
| (NH₄)₂Mo₂O₇, | |
| (NH₄)₆H₂W₁₂O₄₀.xH₂O, and | |
| WO₃; | |
| Group IVA metal compounds, such as: | |
| GeO₂, SnO₂ and PbO | |
| Other metal compounds, such as: | |
| MgO, | NiO, |
| V₂O₅, | Ni(NO₃)₂.6H₂O, |
| MnO₂, | Ni(OH)₂, |
| Fe₂O₃, | NiCO₃, |
| CoO, | 2NiCO₃.3Ni(OH)₂.4H₂O, |
| Co(NO₃)₂.6H₂O, | Ni(C₂H₃O₂)₂, |
| Co(OH)₂, | NiC₂O₄.2H₂O, |
| CoCO₃, | Ni(CHO₂)₂.2H₂O, |
| 2CoCO₃.Co(OH)₂.H₂O, | NiSO₄, |
| Co(C₂H₃O₂)₂.4H₂O, | CuO, |
| Co(C₂H₃O₂)₃, | ZnO, |
| Co(CHO₂)₂.2H₂O, | SiO₂, |
| Co₂O₃.3H₂O, | Sb₂O₃ and |
| CoC₂O₄, | Bi₂O₃. |
| CoSO₄, | |

Of these we prefer TiO₂ and ZrO₂.

Also required for the preparation of the novel catalyst herein is an aqueous solution containing water, as the third component, and dissolved therein, as the fourth component; at least one compound sufficient to impart to said aqueous solution a pH below 6, generally in the range of about 0.1 to about 5.5, but, most preferably, from about 1.0 to about 5.0. For such use any water-soluble compound, organic or inorganic, but preferably inorganic, that can impart to said aqueous solution a pH below 6 can be used. Specific examples of such water-soluble compounds that can be used include inorganic acids, such as nitric acid, sulfuric acid, hydrofluoric acid, hydrochloric acid, phosphoric acid and boric acid, organic acids, such as acetic acid, oxalic acid, citric acid, tartaric acid and formic acid, salts, such as aluminum nitrate, aluminum chloride, aluminum sulfate, ammonium nitrate, ammonium chloride and water-soluble nitrate and chloride salts of transition metals, such as iron, chromium, copper, zinc and lanthanum. Of these we prefer the mineral acids, nitric acid and hydrochloric acid. Most preferred is aqueous nitric acid having a concentration of about five to about 90 weight percent, preferably about 10 to about 70 weight percent.

If desired, for example, to further enhance the catalytic performance of the novel catalyst herein, by, for example, increasing activity, altering selectivity or prolonging useful lifetime, we can add to the mixture obtained from a combination of the above-named four components, any one or combination of metal compounds listed above as constituting the second component, but which had not been previously used, or any ammonium compound that will decompose or volatilize under the calcination conditions defined above, such as ammonium hydroxide, ammonium acetate, ammonium nitrate, etc. Of the ammonium compounds so used we prefer ammonium hydroxide.

The resulting mixture when the above four components are combined will contain the four components in the following amounts in weight percent.

TABLE I

| | Weight Percent | | |
|---|---|---|---|
| | Broad Range | Preferred Range | Most Preferred Range |
| Alumina | 15–75 | 20–60 | 25–45 |
| Metallic component(s) | 0.1–25 | 0.5–10 | 1–5 |
| Water | 15–80 | 30–75 | 50–70 |
| Acidic Component(s) | 0.001–10 | 0.01–2 | 0.1–0.7 |

When the optional component is added to the above four components in the mixture, the resulting mixture will contain each of the components in the following amounts in weight percent.

TABLE II

| | Weight Percent | | |
|---|---|---|---|
| | Broad Range | Preferred Range | Most Preferred Range |
| Alumina | 15–70 | 20–50 | 25–40 |
| Metallic component(s) | 0.1–25 | 0.5–10 | 1–5 |
| Water | 20–75 | 30–70 | 50–60 |
| Acidic Component(s) | 0.001–10 | 0.01–2 | 0.1–0.7 |
| Optional Component(s) | 0.01–20 | 0.1–10 | 0.6–7 |

The mixtures defined above are preferably obtained by intimately mixing together, in any desired manner, the four or more components defined above until a substantially homogeneous entity is obtained. In an especially preferred embodiment, the alumina and the metallic component or components are first brought together and mixed, after which they are then further mixed with the aqueous solution of desired pH. The resulting paste, or slurry, can then be formed into any desired shape following any desired or conventional procedure to obtain extrudates or spheres, or the mixture can be spray-dried to obtain a fluid catalyst. Following this, the formed entity can be dried, for example, at a temperature of about 100° to about 200° C. to remove water therefrom, and then, optionally, calcined in air at any suitable temperature, for example, in the range of about 200° to about 1200° C., preferably from about 300° to about 800° C., for about 0.5 to about 24 hours, preferably for about two to about 20 hours. The resulting product, composed of alumina carrying the metallic component(s) thereon, can be used as such as a catalyst, or additional catalytic components can be added thereto, for example, by impregnation, mix-mulling compositing, etc., followed by, if required, drying and calcination as defined above. The additional components that can be so added in a second stage can be one or more of the metallic components previously listed as being suitable for use in the first stage but which had not been previously used.

The selection of the method of additional component addition, for example, nickel nitrate or nickel carbonate, is based upon the characteristics of the added catalyst material, the nature of the desired additional component and the intended process application. For fixed-bed catalysis utilizing extrudates or other formed particles, incipient wetness (no excess solution) impregnation is the preferred procedure. The solution employed is preferably aqueous, and any combination of mutually-soluble components can be added to the catalyst by way of the solution prior to the additional drying and calcining, if used, as defined in the first stage above.

When the catalyst prepared from the four or more components has not been formed into particles, such as extrudates, then other methods of additional component blending, in addition to impregnation, can be utilized. Such methods include mix-mulling and compositing. These methods are used primarily to add insoluble components to a fluid or finely-divided catalyst. Mix-mulling implies the use of a liquid to aid in the mixing and blending of two or more solid materials. The resulting blend can be formed as described above into extrudates, spheres, etc., or additional solution can be added to form a pumpable slurry for purposes of spray drying. Compositing implies a dry mixing of two or more components. The mixture can then be formed into tablets, or a liquid can be added thereto to facilitate formation by extrusion, spheronization, etc., or a slurry can be formed to facilitate spray drying.

The addition of other components in the second stage, if used, can be done in any convenient manner, examples of which are set forth below.

(1) Calcined extrudates can be impregnated with compounds dissolved in solution using the well-known incipient wetness (no excess solution) method. Compounds can be added in a single step wherein one or more compounds are dissolved in solution and simultaneously added to the catalyst, followed by drying and calcination. If desired, several steps can be employed with intermediate heat treatments. For example:

(A) A first solution of nickel nitrate hexahydrate can be prepared by dissolving the salt in a mixture of water and ammonium hydroxide. A second solution can be prepared by dissolving ammonium paramolybdate in a mixture of water and ammonium hydroxide. The two solutions can be combined and the pH can be adjusted to about 9.6 using additional ammonium hydroxide. This solution can then be used to impregnate an extrudate prepared in the first stage containing, for example, $Al_2O_3$ and $TiO_2$, followed by drying and calcination. The resultant catalyst will contain nickel, titanium and molybdenum as oxides and alumina.

(B) Alternatively, the extrudes of $Al_2O_3$ and $TiO_2$ can be impregnated in a two-step process with intermediate heat treatment. In such case, this can be done by dissolving ammonium molybdate in a mixture of ammonium hydroxide and water and using the resulting solution to impregnate the extrudates. After drying, and optionally calcining, the impregnated extrudate can be further impregnated using an aqueous solution of nickel nitrate hexahydrate, followed by drying and calcination to obtain a catalyst containing nickel, titanium and molybdenum as oxides and alumina.

(C) A third procedure utilizing impregnation techniques would be to use extrudates prepared by blending alumina precursor, TiO₂, an aqueous solution of nitric acid, and ammonium molybdate dissolved in a mixture of water and ammonium hydroxide, followed by extrusion, drying and calcination. These extrudates can then be impregnated with an aqueous solution of nickel nitrate hexahydrate, followed by drying and calcination. The resulting catalyst will contain nickel, titanium and molybdenum as oxides and alumina.

(2) The method of mix-mulling can be used when aggregates, such as extrudates, are not formed from the initial mixture. For instance, a catalyst resulting from the blending of alumina precursor, titania, an aqueous solution of nitric acid, and ammonium molybdate dissolved in a mixture of water and ammonium hydroxide can be dried, calcined and sized to 100–200 mesh particles. This catalyst can be dry blended with nickel carbonate and sufficient water to form a paste, and the resulting combination can be thoroughly mix-mulled, after which the catalyst is dried, calcined, sized to 100–200 mesh and then tabletted to obtain a catalyst containing nickel, titanium and molybdenum as oxides and alumina.

(3) A composite catalyst can be prepared by blending alumina precursor, titania and an aqueous solution of nitric acid, followed by drying, calcining and sizing to 100–200 mesh. The catalyst can be blended with nickel oxide and molybdenum oxide. The powder can be tableted, using ⅛-inch dies, then dried and calcined to form a catalyst containing nickel, titanium and molybdenum as oxides and alumina.

DESCRIPTION OF PREFERRED EMBODIMENTS

EXAMPLE I 226.9 grams of Harshaw alumina, Al 4100P, containing 73.4 weight percent of Al₂O₃, were dry mixed with 18.5 grams of TiO₂, and the resulting mixture was further mixed with a solution consisting of 1.8 grams of 70 weight percent aqueous nitric acid that had been diluted with water to a total volume of 167 milliliters. The total amount of water thus present was 165 milliliters, and the pH of the aqueous solution prior to mixing was 2.1. The components were mixed over a period of two hours to obtain a paste. The paste so obtained was then converted to 1/16-inch (1.6 mm) extrudates which were then dried at 120° C. over a period of 20 hours and calcined in air at 450° C. over a period of 10 hours.

A portion of the extrudates so obtained, which contained 78.4 grams of Al₂O₃, was impregnated with a solution prepared as follows: 15.4 grams of Ni(NO₃)₂.6H₂O, ammonium hydroxide and water were combined to form a solution whose total volume amounted to 50 milliliters and whose pH was 9.5. A separate solution was prepared by dissolving 15.0 grams of ammonium para molybdate (containing 82.5 weight percent MoO₃), ammonium hydroxide and water, whose total volume amounted to 65 ml and whose pH was 9.7. The impregnating solution was obtained by combining the two solutions thus formed and adding thereto additional amounts of water and ammonium hydroxide to obtain a volume of 193 ml and a solution having a pH of 9.6. The impregnated extrudates were dried at 120° C. over a period of 20 hours and then calcined at 550° C. over a period of 10 hours. The resultant catalyst was sized to 16–30 mesh. The amounts of materials used and conditions employed are further set forth below in Table IV.

EXAMPLE II 226.9 grams of Harshaw alumina, Al 4100P, containing 73.4 weight percent of Al₂O₃, were thoroughly mixed with a suspension composed of 27.5 grams of TiO₂ and 851 ml of water. The resultant mixture was dried at 120° C. for 20 hours and then sized through a 100 mesh screen. The material passing through the screen was mixed with a solution consisting of 2.7 grams of 70 weight percent aqueous nitric acid that had been diluted with water to a total volume of 330 ml. The total amount of water thus present was 328 ml and the pH of the aqueous solution prior to mixing was 2.2. The components were mixed over a period of two hours to obtain a paste. The paste so obtained was then converted to 1/16-inch (1.6 mm) extrudates which were then dried at 120° C. over a period of 20 hours and calcined in air at 700° C. over a period of 10 hours.

A portion of the extrudates so obtained, which contained 168 grams of Al₂O₃, was impregnated with 205 ml of a solution having a pH of 9.6 prepared as in Example I using 33.0 grams of Ni(NO₃)₂.6H₂O, 32.2 grams of ammonium molybdate (containing 82.5 weight percent MoO₃), ammonium hydroxide and water. The impregnated extrudates were dried at 120° C. over a period of 20 hours and then calcined at 550° C. over a period of 10 hours. The resultant catalyst was sized to 16–30 mesh. The amounts of materials used and conditions employed are further set forth in Table IV.

EXAMPLE III

The procedure of Example I was repeated except that methyl cellulose (an extrusion aid) was dry-blended with the alumina and titania. No acidic component was added to the water. The amounts of materials used and conditions employed are further set forth below in Table IV.

EXAMPLE IV

The procedure of Example I was further repeated except that ZrO₂ was employed in place of TiO₂. The ZrO₂ was obtained by comingling a ZrO(NO₃)₂ aqueous solution with a 1:1 volume solution of NH₄OH:H₂O at a pH of 7, filtering the slurry, washing the cake, drying the cake at 120° C. over a period of 20 hours, then calcining in air at 500° C. over a period of 10 hours and sizing through 80 mesh. The amounts of materials used and conditions employed are further set forth below in Table IV.

EXAMPLE V

The procedure of Example III was followed, except that ZrO₂ was employed in place of TiO₂. The amounts of materials used and conditions employed are further set forth below in Table IV.

EXAMPLE VI 680.7 grams of Harshaw alumina, Al 4100P, containing 73.4 weight percent of $Al_2O_3$, and 55 grams of $TiO_2$ were dry mixed and the resulting mixture was further mixed with a solution consisting of 5.6 grams of 70 weight percent aqueous nitric acid that had been diluted with water to a total volume of 500 ml. The total amount of water thus present was 494 ml and the pH of the aqueous solution prior to mixing was 2.2. The components were mixed over a period of one hour to obtain a paste. The paste so obtained was further mixed with an aqueous solution containing 95.8 grams of dissolved ammonium para molybdate, 42 ml of ammonium hydroxide and 127 ml of water. The resultant mixture was then converted to 1/16" (1.6 mm) extrudates, which were then dried at 120° C. over a period of 20 hours and calcined in air at 700° C. over a period of 10 hours. A portion of these extrudates which contained 90.9 grams of $Al_2O_3$ was weighed out and impregnated with a solution prepared by dissolving 17.8 grams of $Ni(NO_3)_2.6H_2O$ in water to a total volume of 116 ml. Following impregnation the extrudates were dried at 120° C. over a period of 20 hours and then calcined at 550° C. over a period of 10 hours. The resulting catalyst was sized to 16-30 mesh. The amounts of materials used and the conditions employed are further set forth below in Table V.

EXAMPLE VII

The procedure of Example VI was repeated, except that 11.1 grams of 70 weight percent aqueous nitric acid was used. The amounts of materials used and conditions employed are further set forth below in Table V.

EXAMPLE VIII

The procedure of Example VI was repeated except that 3.3 grams of 38 weight percent HCl was used in place of nitric acid. The amounts of materials used and conditions employed are further set forth below in Table V.

EXAMPLE IX

The procedure of Example VI was again repeated except that methyl cellulose was dry-blended with the alumina and titania. No acidic component was added to the water. The amounts of materials and conditions employed are further set forth below in Table V.

Each of the catalysts prepared above contained three weight percent nickel metal, five weight percent titanium or zirconium metal, and eight weight percent molybdenum metal present as oxides and supported on the $Al_2O_3$.

Each of the catalysts prepared above was tested for its catalytic activity as follows: In each case 102 ml of the catalyst was charged to the reactor, after which the reactor was purged with one standard cubic foot (0.028 cubic meter)/hour of nitrogen at atmospheric pressure and 149° C. for 30 minutes. The catalyst was further pretreated with a distillate, spiked with 2000 ppm of sulfur as $CS_2$, which was introduced into the reactor at a flow rate of 102 ml per hour and a temperature of 149° C. Hydrogen was then introduced at a flow rate of 0.358 standard cubic feet (0.01 cubic meter) per hour and 200 psig (1379 kPa). The temperature was then raised at the rate of 26° C. per hour to 204° C. The pretreatment lasted for a period of 12 hours. After pretreatment, the distillate flow was stopped and the feedstock was begun at 204° C. and a charge rate of 61 ml per hour. The hydrogen feed rate was thereupon increased to 1.54 standard cubic feet (0.044 cubic meter) per hour and 2000 psig (13,790 kPa). Over a period of one hour the temperature was raised to 360° C. and the run was begun. The feedstock consisted of Kuwait first-stage HDS product containing 1 weight percent sulfur spiked with 1500 ppm sulfur as $CS_2$. Properties of the feedstock are defined below in Table III.

TABLE III

| Feedstock Properties | |
|---|---|
| Gravity, °API | 19.9 |
| Sulfur, Wt % | 1.00 |
| V, ppm | 21 |
| Ni, ppm | 10 |
| Distillation, D 1160 | |
| 5% over at °F. (°C.) | 551 (288) |
| 10% over at °F. (°C.) | 703 (373) |
| 20% over at °F. (°C.) | 763 (406) |
| 30% over at °F. (°C.) | 817 (436) |
| 40% over at °F. (°C.) | 861 (461) |
| 50% over at °F. (°C.) | 910 (488) |
| 60% over at °F. (°C.) | 966 (519) |
| 70% over at °F. (°C.) | 1013 (545) |
| 80% over at °F. (°C.) | cracked at 70% |

The product was collected every four hours and analyzed for sulfur. The activity data obtained, presented below in Tables IV and V, are an average for 36- and 40-hour periods. Catalyst activity was defined as follows:

$$\text{Wt \% Hydrodesulfurization} = [(S_o - S)/S_o] \times 100\%$$

wherein $S_o$ and $S$ are the feedstock and product sulfur respectively.

TABLE IV

| Example No. | I | II | III | IV | V |
|---|---|---|---|---|---|
| Initial Treatment | | | | | |
| Al 4100P, g. | 226.9 | 340.4 | 408.8 | 408.8 | 408.8 |
| Group IVB Oxide | $TiO_2$ | $TiO_2$ | $TiO_2$ | $ZrO_2$ | $ZrO_2$ |
| Grams of Group IVB Oxide | 18.5 | 27.5 | 33.0 | 26.2 | 26.2 |
| Nitric Acid, g. | 1.8 | 2.7 | None | 3.3 | None |
| Methyl Cellulose, g. | None | None | 3.25 | None | 3.25 |
| Water, ml. | 165 | 328 | 418 | 442 | 445 |
| pH of Aqueous Solution | 2.1 | 2.2 | 6.4 | 2.2 | 6.4 |
| Subsequent Treatment | | | | | |
| Wt of $Al_2O_3$ In Extrudate, g. | 78.4 | 168 | 88.7 | 90.9 | 99.3 |
| $Ni(NO_3)_2.6H_2O$, g. | 15.4 | 33.0 | 17.4 | 17.4 | 19.0 |
| Ammonium Para Molybdate, g. | 15.0 | 32.2 | 17.2 | 17.0 | 18.9 |
| Vol. of Impregnating Solution, ml. | 98 | 205 | 114 | 133 | 145 |
| pH of Impregnating Solution | 9.6 | 9.6 | 9.6 | 10.0 | 10.1 |
| Activity, % Hydrodesulfurization | 62.1 | 62.6 | 58.8 | 59.3 | 54.7 |

TABLE V

| Example No. | VI | VII | VIII | IX |
|---|---|---|---|---|
| Initial Treatment | | | | |
| Al 4100P, g., | 680.7 | 680.7 | 408.8 | 408.8 |
| $TiO_2$, g. | 55.0 | 55.0 | 33.0 | 33.0 |
| Nitric Acid, g. | 5.6 | 11.1 | None | None |
| Hydrochloric Acid, g. | None | None | 3.3 | None |
| Methyl Cellulose, g. | None | None | None | 3.25 |
| Ammonium Para Molybdate, g. | 95.8 | 95.8 | 57.0 | 57.0 |
| Water, ml. | 622 | 618 | 399 | 400 |

TABLE V-continued

| Example No. | VI | VII | VIII | IX |
|---|---|---|---|---|
| Ammonium Hydroxide, ml | 42 | 42 | 25 | 25 |
| pH of Aqueous Solution Subsequent Treatment | 2.2 | 1.6 | 2.2 | 6.4 |
| Wt of Al$_2$O$_3$ In Extrudate, g. | 90.9 | 82.0 | 93.2 | 102 |
| Ni(NO$_3$)$_2$.6H$_2$O, g.. | 17.8 | 16.1 | 18.3 | 20.1 |
| Vol. of Impregnation Solution, ml. | 116 | 87 | 135 | 137 |
| Activity, % Hydrodesulfurization | 61.6 | 61.0 | 60.4 | 59.6 |

The unexpected advantages resulting from the process defined and claimed herein are apparent from the data in Tables IV and V above. Note that when the procedure claimed herein is followed in each of Examples Nos. I and II, the activity was 62.1 and 62.6 percent, respectively. When, instead in Example No. III an aqueous solution not having a pH below 6 was used, the activity of the catalyst was reduced to 58.8 percent. Although Example No. IV shows that a catalyst produced herein using ZrO$_2$ is not as active as a similar catalyst using TiO$_2$; nevertheless Example No. V shows that when such catalyst is prepared using an aqueous solution not having a pH below 6, its activity is much lower, 54.7 percent against 59.3 percent. Examples Nos. VI and VII show that various concentrations of acid are suitable. Example No. VII clearly illustrates that hydrochloric acid as well as nitric acid can be used to impart a pH below 6 to the aqueous solution being used in the preparation of the catalyst. The failure to use such an aqueous solution in the preparation of the catalyst in Example No. IX resulted in a catalyst of reduced activity.

Obviously, many modifications and variations of the invention, as hereinabove set forth, can be made without departing from the spirit and scope thereof, and therefore only such limitations should be imposed as are indicated in the appended claims.

We claim:

1. A process for preparing catalysts of increased activity which comprises mixing alumina with (1) at least one solid metal compound selected from the group consisting of TiO$_2$, TiO$_2$.xH$_2$O, Ti$_2$O$_3$, ZrO$_2$, ZrO$_2$.xH$_2$O, HfO$_2$, and WO$_3$ and (2) thereafter mixing the alumina and metal compound mixture with an aqueous solution containing at least one dissolved compound therein that imparts to said aqueous solution a pH below 6, the resulting mixture containing from 20 to 60 weight percent alumina, 0.5 to 10 weight percent of said solid metal compound, 30 to 75 weight percent water, and 0.01 to 2 weight percent of said dissolved compound, drying, and calcining the alumina having the metal compound deposited thereon.

2. The process of claim 1 wherein the pH of said aqueous solution is in the range of about 0.1 to about 5.5.

3. The process of claim 1 wherein the pH of said aqueous solution is in the range of about 1.0 to about 5.0.

4. The process of claim 1 wherein said dissolved compound is an inorganic acid.

5. The process of claim 4 wherein said inorganic acid is nitric acid.

6. The process of claim 4 wherein said inorganic acid is hydrochloric acid.

7. The process of claim 1 wherein said metal compound is titanium oxide or zirconium oxide.

8. The process of claim 1 wherein said metal compound is titanium oxide.

9. The process of claim 1 wherein said metal compound is zirconium oxide.

10. The process of claim 1 wherein the components used fall within the following ranges:

| | Weight Percent |
|---|---|
| Alumina | 25–45 |
| Metallic Component(s) | 1–5 |
| Water | 50–70 |
| Acidic Component(s) | 0.1–0.7 |

11. The process of claim 1 wherein the resulting mixture is dried and then calcined in air at a temperature of about 200° to about 1200° C.

12. The process of claim 1 wherein the resulting mixture is dried and then calcined in air at a temperature of about 300° to about 800° C.

* * * * *